Patented Mar. 22, 1938

2,112,200

UNITED STATES PATENT OFFICE 2,112,200

ACTIVATION OF CHOLESTEROL

Morris S. Kharasch and Sidney Weinhouse, Chicago, Ill., assignors to Eli Lilly and Company, Indianapolis, Ind., a corporation of Indiana No Drawing. Application January 18, 1937, Serial No. 121,178

8 Claims. (Cl. 260—153)

Our invention relates to the activation of cholesterol to produce therein an increased amount of pro-vitamin D, so that upon irradiation there will be increased amounts of an anti-rachitic vitamin D.

Ergosterol was for a long time thought to be the only pro-vitamin D, activatable by ultra-violet irradiation to produce vitamin D. It has now been established, however, that that is not the case, and that other substances can be activated by such irradiation to produce anti-rachitic substances—whether or not they be called vitamin D. It is now known that the anti-rachitic substance produced by the irradiation of a pro-vitamin present in cholesterol has therapeutic properties not possessed by irradiated ergosterol. Thus that anti-rachitic substance is much more effective than is irradiated ergosterol in its capacity to cure chick rickets.

Koch and his co-workers have shown [J. Biol. Chem. Vol. 85, p. 141 (1927); Vol. 108, p. 773 (1935).] that by heating cholesterol for one to two hours to 150° to 200° C., there is a marked activation of the cholesterol in its content of pro-vitamin D; and that this activation of cholesterol is greater if air is present with the cholesterol than if air is excluded. By heating cholesterol in air for 1 hour at 190° C., and then irradiating it with ultra-violet light, Koch obtained a product which when assayed on rats for antirachitic properties was active in daily doses of 0.05 mg.; and by heating cholesterol in air for 2 hours at 190° C. and likewise irradiating it obtained a product which when similarly assayed gave a + + healing in daily doses of 0.3 mg.

It has also been proposed to activate cholesterol, from the standpoint of its content of pro-vitamin D, by dissolving the cholesterol in hot ethyl alcohol, with or without acetic acid present, and subjecting such solution of cholesterol to the action of an oxidizing agent also dissolved in that solution. As such dissolved oxidizing agents, hydrogen peroxide, benzoyl peroxide, eosin, and chromic anhydride have been suggested.

These procedures are indeed somewhat effective in increasing the content of pro-vitamin D in cholesterol, so that on irradiating the cholesterol so activated, as with ultra-violet light, a greater yield of vitamin D is obtained than by similar irradiation of unactivated cholesterol.

We have discovered, however, that cholesterol may be much more effectively activated, to produce a pro-vitamin D, than has been possible by previous procedures, such as those indicated above.

According to our invention, we mix cholesterol and benzoyl peroxide, with both ingredients in the solid state, and heat them to a temperature of the order of 120° to 250° C., preferably at about 200° C. We advantageously do this with air excluded, and in vacuo. This is done most conveniently and effectively in a vacuum still, in the heating chamber of which the mixed solid cholesterol and solid benzoyl peroxide, together with mercury, are heated so that the mercury will be distilled and will carry over with it into the condensing chamber of the still the activated distilled cholesterol.

The activated cholesterol from the condensing chamber of the vacuum still is rich in pro-vitamin D. It may be irradiated with ultra-violet light, in the usual manner, and upon such irradiation becomes exceedingly rich in vitamin D. This distilled cholesterol is found to be activated several hundred times over the original cholesterol. Indeed, we can obtain a vitamin D content which is greater than has ever been obtained, so far as we know, with any cholesterol, not only ordinary cholesterol but any activated cholesterol of which we are aware.

The cholesterol used as starting material may be ordinary commercial cholesterol containing some pro-vitamin D, or a cholesterol from which much if not all of the normally present pro-vitamin D has been removed by known procedures. Thus, starting with cholesterol from which normally occurring pro-vitamin D has been removed by known chemical means to such an extent that when irradiated a daily dose of one mg. was insufficient to show any curative effect on rachitic rats, the above-described process yields a product which, when irradiated, is effective in curing rickets in rats fed this material in daily doses of 0.01 mg. (3.17 + cure).

The following are examples of our process:

Example 1

We thoroughly mix 3.8 gm. of cholesterol with 2.4 gm. of benzoyl peroxide, as by grinding them together in a mortar. The mixture is suitably heated in an open flask, to a temperature of about 110° C. At this temperature a violent reaction usually occurs, with a rise in temperature to at least 120° C., a dark-brown liquid is formed, and some benzoic acid usually collects in the cold part of the flask.

After the initial reaction is over, which usually takes about 15 to 20 minutes, the temperature may be raised to about 150° C., and kept at this point for about 30 minutes to one hour. Then the material is allowed to cool; and the brown liquid present solidifies on that cooling.

The contents of the flask, whether or not the aforesaid heating to 150° C. was done, are now irradiated with ultra-violet light in any suitable manner. If desired, the benzoic acid liberated during the reaction may be removed, preferably before such irradiation, by dissolving the residue in ether and extracting the ether solution with an alkaline water solution, as of sodium carbonate or bicarbonate, which takes up the benzoic acid in the form of a benzoate, but leaves the activated cholesterol in the ether. The ether may be removed by evaporation, desirably in vacuo, leaving the activated cholesterol as a residue. If the irradiation has not already been done—for it may be done at any stage after the activation—this residue is now irradiated to convert the pro-vitamin D into an anti-rachitic substance—a vitamin D.

*Example 2*

The procedure described in Example 1 may be carried out with the flask closed and evacuated. This results in products of higher potency than when the flask is open to the air; although good results are obtainable in either way.

*Example 3*

We mix 1.9 gm. of cholesterol with 1.4 gm. of benzoyl peroxide; and put the mixture, together with 250 gm. of metallic mercury, in the heating chamber of a suitable vacuum still; suitably exhaust the air from the still with any suitable vacuum pump; heat the heating chamber and its contents to approximately 180° to 250° C. while maintaining the vacuum, to distill the contents of the heating chamber and carry them over into the condensing chamber, and collect and condense the distilled material in that condensing chamber of the still. The pressure in the vacuum still is desirably of the order of 0.001 to 1.000 mm. of mercury.

The distillate contains metallic mercury, benzoic acid, and an activated cholesterol. This cholesterol and the benzoic acid are separated from the mercury by extraction with ether and suitable filtration. The filtrate, on evaporation to dryness in vacuo, yields a solid usually weighing about 1.4 to 2.6 gm. The benzoic acid may be separated from the cholesterol as in Example 1, to leave about 1.0 to 1.5 gm. of the activated cholesterol. That cholesterol is found to be very greatly activated by reason of the distillation in the presence of the benzoyl peroxide. We do not know that the mercury plays any part other than in assisting in the distillation, and in carrying over the activated cholesterol from the heating chamber to the condensing chamber.

The activated cholesterol thus obtained is now suitably activated, as by irradiation by ultra-violet light, as in Example 1; and is found to be effective as noted above.

We claim as our invention:

1. The process of activating cholesterol to increase its content of pro-vitamin D which on irradiation will yield an anti-rachitic vitamin D, which consists in heating solid cholesterol and solid benzoyl peroxide togethter to a temperature of about 120° to about 250° C.

2. The process of activating cholesterol to increase its content of pro-vitamin D which on irradiation will yield an anti-rachitic vitamin D, which consists in heating solid cholesterol and solid benzoyl peroxide together in vacuo to a temperature of about 120° to about 250° C.

3. The process of activating cholesterol to increase its content of pro-vitamin D which on irradiation will yield an anti-rachitic vitamin D, which consists in heating solid cholesterol and solid benzoyl peroxide together in air to a temperature of about 120° to about 250° C.

4. The process of activating cholesterol to increase its content of pro-vitamin D which on irradiation will yield an anti-rachitic vitamin D, which consists in heating solid cholesterol and solid benzoyl peroxide together in the presence of mercury to a temperature of about 120° to about 250° C.

5. The process of activating cholesterol to increase its content of pro-vitamin D which on irradiation will yield an anti-rachitic vitamin D, which consists in heating solid cholesterol and solid benzoyl peroxide together in vacuo in the presence of mercury to a temperature of about 120° to about 250° C.

6. The process of activating cholesterol to increase its content of pro-vitamin D which on irradiation will yield an anti-rachitic vitamin D, which consists in heating solid cholesterol and solid benzoyl peroxide together in air in the presence of mercury to a temperature of about 120° to about 250° C.

7. The process of activating cholesterol to increase its content of pro-vitamin D which on irradiation will yield an anti-rachitic vitamin D, which consists in distilling solid cholesterol and benzoyl peroxide with mercury in a vacuum still.

8. The process of activating cholesterol to increase its content of pro-vitamin D which on irradiation will yield an anti-rachitic vitamin D, which consists in distilling solid cholesterol and benzoyl peroxide in a vacuum still.

MORRIS S. KHARASCH.
SIDNEY WEINHOUSE.